United States Patent
Barrett et al.

(10) Patent No.: US 6,531,174 B2
(45) Date of Patent: *Mar. 11, 2003

(54) CHEWY CONFECTIONERY PRODUCT

(75) Inventors: Louise Barrett, Mayfield Grove (GB); Jamie Edward Geddes, Wheelock Sandbach (GB); Santi Francesco Mangano, Milan (IT); Frank Schmick, Linton on Ouse (GB); Andrew Steve Whitehouse, Harrogate (GB)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,115

(22) Filed: Jan. 28, 2000

(65) Prior Publication Data

US 2002/0001665 A1 Jan. 3, 2002

(30) Foreign Application Priority Data

Jan. 29, 1999 (GB) ............................................. 9902073

(51) Int. Cl.[7] .............................. A23L 1/522; A23G 3/00
(52) U.S. Cl. ....................... 426/573; 426/576; 426/578; 426/660; 426/661; 426/519; 426/520
(58) Field of Search ................................ 426/578, 576, 426/659–661, 519, 520, 573

(56) References Cited

U.S. PATENT DOCUMENTS

| 3,218,177 A | * | 11/1965 | Robinson et al. | ............. 99/134 |
| 4,117,176 A | * | 9/1978 | Taylor et al. | ................ 426/660 |
| 4,601,907 A | * | 7/1986 | Knebl et al. | .................... 426/5 |
| 4,726,957 A | | 2/1988 | LaCourse et al. | ........... 426/578 |
| 4,948,615 A | * | 8/1990 | Zallie et al. | ................. 426/578 |
| 5,262,191 A | * | 11/1993 | Chakraborty et al. | ........ 426/578 |
| 5,429,830 A | | 7/1995 | Janovsky et al. | .............. 426/94 |
| 5,476,678 A | * | 12/1995 | Walter et al. | ................ 426/660 |
| 5,603,977 A | * | 2/1997 | Kobayashi et al. | .......... 426/578 |
| 5,626,896 A | * | 5/1997 | Moore et al. | ................ 426/103 |
| 5,879,728 A | * | 3/1999 | Graff et al. | ..................... 426/5 |

FOREIGN PATENT DOCUMENTS

| DE | 2120859 | | 11/1972 |
| DE | 2120859 A | * | 11/1972 |
| GB | 1061886 | | 3/1967 |
| JP | 1132348 A | | 5/1989 |

OTHER PUBLICATIONS

Food Chemistry 3$^{rd}$ Ed Owen Fennema Marcel Dekker Inc NY pp. 201–204, 1996.*
Owen R. Fennema, Food Chemistry, Third Edition, pp. 195–196, 1996.*
B.W. Minifie, "Chocolate, Cocoa, and Confectionary: Science and Technology," 3$^{nd}$ ed., Van Nostrand Reinhold, NY, (1989).
Hawley's Condensed Chemical Dictionary, 13$^{th}$ ed., revised by R.J. Lewis Sr., John Wiley and Sons, NY, (1997).
Zubrev et al., "Use of Oxidized Starch in Fruit Jelly Manufacture", Khlebopekarnaya I Konditerskaya Promyshlennost, 1973, (Abstract in English).

* cited by examiner

Primary Examiner—Keith Hendricks
Assistant Examiner—Drew Becker
(74) Attorney, Agent, or Firm—Winston & Strawn

(57) ABSTRACT

The present invention relates to a chewy confectionery product, preferably a chewy sweet product, and to methods for making such products. The chewy confectionery product contains oxidized starch, optionally in combination with a gum such as gum arabic, as a replacement for at least a part and preferably all of the gelatin in the product. The chewy confectionery product has the property of providing a long-lasting cohesive chew.

18 Claims, No Drawings

CHEWY CONFECTIONERY PRODUCT

TECHNICAL FIELD

The present invention relates to a chewy confectionery product, preferably a chewy sweet product, such as a soft centered chew. The present invention preferably provides a chewy confectionery product which is gelatin free. The present invention further provides a method of preparing these chewy confectionery products.

BACKGROUND ART

Chewy confectionery products are products based on a sugar, glucose syrup and a gelatinizing agent. Chewy sugar-based or sugar-free confectionery products available in the prior art typically contain gelatin as the gelatinizing agent so that they have the chewy texture that is desirable for these products. Indeed, gelatin has been used in manufacturing confectionery products for many years due to its diverse functional properties, in particular, its textural, gel-forming, foam stabilizing and emulsification properties. A confectionery comprising gelatin has a unique "gelatin texture" which is especially desirable to consumers. Chewy confectionery products that contain gelatin have a long-lasting cohesive chew.

Food-grade gelatin, however, is obtained from bovine or porcine raw materials and, thus, the use of gelatin is undesirable to the vegetarian population, as well as for ethnic groups who have concerns about the nature of meat used in certain food products and/or who observe certain dietary constraints concerning the consumption of meat and dairy products. In addition, since gelatin is a protein it is highly sensitive to thermal and/or high acid treatments that cause it to undergo degradation, resulting in loss of its functional properties, reduced cooking efficiencies, loss of active ingredient, and possible fouling which necessitates frequent cleaning of the processing apparatus.

Although, gelatin is the most commonly used hydrocolloid, other gelatinizing agents such as gum arabic, maltodextrin, or modified starches may also be used (See, e.g., B. W. Minifie, Chocolate, Cocoa, and Confectionery: Science and Technology, $3^{nd}$ ed. Van Nostrand Reinhold, NY, (1989)). Modified starches includes a variety of polymers derived from starch by chemically or enzymatically modifying the starch. It is generally known, however, that certain modified starches, such as oxidized starch, have low gelling tendency (See, e.g., Hawley's Condensed Chemical Dictionary, $13^{th}$ ed., revised by Richard J. Lewis, John Wiley & Sons, Inc., NY (1997)) and thus, would not be expected to be useful as a gelatinizing agent in a a chewy confectionery product.

Therefore, it is desirable to provide a chewy confectionery product that excludes gelatin and, thus, overcomes the problems associated with gelatin, but which retains the texture and properties attributed to gelatin that are desired by the consumer. In particular, it is desirable to provide a chewy sweet product which has a long-lasting cohesive chew, but in which at least a portion, preferably all, of the gelatin is replaced in the product.

SUMMARY OF THE INVENTION

The present invention relates to a chewy confectionery product comprising sugar, glucose syrup, and oxidized starch. The chewy confectionery product may be substantially gelatin-free. The sugar may be present in an amount of between about 20 to 70 percent by weight of the chewy confectionery product, the glucose syrup may be present in an amount of between about 30 to 70 percent by weight of the chewy confectionery product, and the oxidized starch may be present in an amount of between about 0.5 to 20 percent by weight of the chewy confectionery product. The ratio of sugar to glucose syrup may be between about 1/0.4 to 1/4. The glucose may have a dextrose equivalent of between about 39 and 48.

The chewy confectionery product may further include water in an amount of between about 2 and 10 percent by weight of the chewy confectionery product and fat in an amount of between about 0.5 to 20 percent by weight of the chewy confectionery product. The chewy confectionery product may further include one or more additional ingredients selected from humectants, artificial sweeteners, emulsifiers, flavor enhancers, proteins, artificial and natural flavors, essential oils, fruit juices, vegetable juices, and colorings. The one or more additional ingredients may be present in an amount of between about 0.5 to 5 percent by weight based on the weight of the chewy confectionery product.

The chewy confectionery product may also further include one or more additional hydrocolloids. The hydrocolloid may be one or more selected from the group consisting of agar agar, xanthane gum, locust bean gum, gellan gum, pectin, carrageenan, and guar gum. The additional hydrocolloid may be gum arabic.

The chewy confectionery product have a center-filled with a liquid, syrup, or powder. The chewy confectionery product may also have at least a part of the sugar replaced with a sugar substitute. The oxidized starch may be obtained from maize or potato.

The invention also relates to a process for preparing the chewy confectionery product. The chewy confectionery product may be prepared by heating the oxidized starch to gelatinize the oxidized starch, mixing the gelatinized starch with the sugar and glucose syrup to produce a formulation mixture, cooking the formulation mixture to provide a cooked mass, and shaping the cooked mass to produce the chewy confectionery product.

The chewy confectionery product may also be prepared by blending a syrup of sugars or sugar substitutes with oxidized starch and water to produce a mixture, heating the mixture to gelatinize the oxidized starch, cooking the mixture to provide a cooked mass, and shaping the cooked mass to produce the chewy confectionery product.

DETAILED DESCRIPTION OF PREFERRED EMBODIMENTS

According to the present invention, it has surprisingly been found that by substituting oxidizing starch for some or preferably all of the gelatin in a chewy confectionery product, it is possible to overcome the disadvantages associated with gelatin, but still provide the preferred gelatin texture of such products.

By "chewy confectionery product" is meant a product based on a sugar, glucose syrup and a gelatinizing agent. These chewy confectionery products may further include water, humectants such as glycerol, artificial sweeteners, emulsifiers such as lecithin, vegetable fat, flavor enhancers such as talin, acids, essential oils, artificial or natural flavorings, colorings, fruit juices, vegetable juices, proteins such as egg white or milk proteins, and other additives, as desired by the skilled artisan when formulating such products.

The present invention provides a chewy confectionery product where oxidized starch is the gelatinizing agent. The oxidized starch replaces at least a portion or all of the gelatin that is typically used as the gelatinizing agent in a chewy confectionery product. Unexpectedly it has been discovered that oxidized starch, although known to have a low gelling tendency, nevertheless provides a chewy confectionery product that has a texture and a long-lasting cohesive chew, similar to that found in a chewy confectionery products that contain gelatin.

According to one embodiment of the invention, the chewy confectionery product is preferably substantially gelatin-free. The term "substantially gelatin-free" is used to mean that the product has no intentional addition of gelatin or that the amount of gelatin present does not contribute to the chewy nature of the product.

According to another embodiment of the invention, a chewy confectionery product is provided in which at least a portion of the gelatin, and preferably all of the gelatin, is replaced with a combination of oxidized starch and one or more additional hydrocolloids, the most preferred of which is gum arabic.

Preferably, the chewy confectionery product of the invention is a chewy sweet product, optionally, a chewy sweet product which is filled with a liquid or syrup center. By "chewy sweet product" is meant a chewy confectionery product containing sugar or a sugar substitute. The chewy confectionery product may also contain a reduced sugar content. In the sugar free and reduced sugar confectionery products, all or part of the sugar is replaced with one or more sugar substitutes.

The chewy sweet product may comprise a non-crystallized, semi-crystalline or crystallized material, such as crystallized or non-crystallized sucrose that contains ingredients that give it a certain resistance to chewing prior to dissolution in a glucose syrup. Examples of such ingredients include gelatin; starches; hydrocolloids such as gums, pectins, and the like; and maltodextrins.

Generally, the chewy sweet products are based on a matrix of sugars which form the semi-crystalline material to support the ingredients that impart chew resistance. In general, the continuous phase of the chewy sweet product supports the sucrose crystals and contains ingredients such as dissolved sugar, glucose syrup, and the like. The mass phase of the chewy sweet product contains fat as a separate phase.

The chewy confectionery product is distinguished from other confectionery products such as chewing gums, which have insoluble components and are not intended to be dissolved upon chewing; toffees which contain sugars and milk derivatives as the main ingredients and are characterized by a caramelization process; gums and other hydrocolloid products, which are characterized by gelling behavior and where sugar crystallization is not desired; and jellies characterized by the lack of a gel which determines the textural character. Thus, the chewy confectionery product of the invention is essentially free of insoluble components and is not a toffee, gum or jelly. "Essentially free: means that there is no intentional addition of insoluble components such that the entire product is intended to be dissolved upon chewing.

The chewy confectionery product of the present invention may be a gelatin free, center-filled chewy confectionery product in which the center filling may be, for example, a liquid or syrup center, in particular, containing nutritional substances, such as, vitamins, minerals, herbal extracts, oligosaccharides, and the like. According to this embodiment of the invention, it is preferred that the gelatin be replaced by a combination of oxidized starch and gum arabic. The relative amount of each component in this combination is not critical and can range from about 10 to 90% with between 33 and 66% being preferred.

The property of the gelatin which is replicated in a chewy sweet product according to the present invention by replacing the gelatin with oxidized starch, preferably also in combination with gum arabic, is that of obtaining a long-lasting, cohesive chew.

Oxidized starch is a starch obtained from any conventional source, including maize, potato, and the like, which has undergone an oxidation reaction. For example, oxidized starch can be obtained when an aqueous starch suspension is treated with an oxidizing agent, such as sodium hypochlorite, which oxidizes the primary alcohol group at the C6 position of the starch molecule to a carboxylic acid group. Oxidation introduces a high degree of steric hindrance into the molecule that prevents or greatly reduces the tendency for short chain fractions to reform as retrogradation bundles. The complex reaction involves hydrolysis, ring rupture, and carboxylation (conversion of —OH groups to —COOH groups) of the starch molecule, to reduce the viscosity of the starch solution and give a softer set back, i.e., a minimally weak gel at normal levels of use.

Techniques for detecting oxidized starch at a functional level (above approximately 1%) rely on detecting the carbonyl group which is specific to the oxidized starch. Suitable techniques include Fourier Transform Infra Red (FTIR) spectroscopy and solid state NMR spectroscopy.

According to the invention, the chewy confectionery product may contain oxidized starch in an amount of from about 0.5 to 20%, and preferably about 5 to 10%, by weight of the chewy confectionery product. Preferably, the chewy confectionery product contains oxidized starch in combination with gum arabic. The gum arabic is present in an amount of about 0 to 10%, preferably about 1 to 8% by weight of the chewy confectionery product.

In the final product, at least the major part of the oxidized starch is gelatinized through cooking. Preferably, the oxidized starch is fully gelatinized.

When the chewy confectionery product of the present invention is sugar-based, it usually contains about 30% to 90%, preferably from 40% to 70%, by weight based on the weight of the chewy confectionery product, of syrup or sugars. The syrup or sugars may be, for example, corn syrup; glucose syrup; invert syrup; high fructose syrup; (crystalline) sucrose; fructose; maltose. As noted above, the chewy confectionery product may also include a sugar substitute to replace all or part of the sugar in the chewy confectionery product. Sugar replacements, include, but are not limited to, isomalt, maltitol, sorbitol, mannitol, lactitol, trehalose, xylitol, and the like. Different types of sugar systems can be used to manipulate the final textural properties of the chewy confectionery product. For example, the chewy sugar-based product of the present invention may contain crystalline sucrose.

The amount of sugar or sugar substitute in the chewy confectionery product may be from about 20 to 70 percent by weight, preferably about 30 to 50 percent by weight of the chewy confectionery product and the amount of glucose may be from about 30 to 70 percent by weight, preferably about 40 to 65 percent by weight of the chewy confectionery product. The ratio of sugar to glucose syrup may range from about 1/0.4 to 1/4, preferably from about 1/0.75 to 1/2. The amount of gelatinizing agent in the chewy confectionery product may be from about 0.1 to 10 percent by weight, preferably 0.2 to 5 percent by weight of the chewy confectionery product.

The glucose syrup is preferably a medium conversion glucose, i.e., one having a dextrose equivalent (DE) of about 39–48, preferably about 40–45, and more preferably is regular or standard glucose, i.e., one having a DE of about 42.

In addition to the oxidized starch, the sugar systems, and other hydrocolloids (preferably gum arabic) the chewy confectionery product may contain additional typical ingredients such as a food-acceptable acids, for example, lactic acid, malic acid, tartaric acid, ascorbic acid, hydrochloric acid, and citric acid; fruit juices; vegetable juices; fats; and the like. The amount added will depend on the final product but may be in the range of from about 0.5% to 5%, preferably from about 0.75% to 2%, by weight based on the weight of the chewy confectionery product. Fat may also be present in the chewy confectionery product an amount of between about 0.5 to 20 percent by weight, preferably 2 to 12 percent by weight of the chewy confectionery product. The confectionery product may further comprise additional additives such as flavors; a humectant such as glycerol; artificial sweeteners for sugar free and reduced sugar products; emulsifiers such as lecithin; flavor enhancers such as talin; colors; proteins, for example, egg white or milk protein in the case of aerated systems; and the like. The amounts and type of additive will depend on the end product. Suitable amounts of these additives are from about 0.1% to 5%, preferably from about 0.2 to 2%, by weight based on the weight of the chewy confectionery product. The remainder of the confectionery product is water. The amount of water in the finished chewy confectionery product of the invention may be from about 2% to 20%, preferably from about 6% to 15%, and more preferably from about 5 to 7.5 percent by weight of the chewy confectionery product.

Preferably, the chewy confectionery product of the present invention is a composition based on a syrup matrix comprising a solution of sugars, sugar substitutes and/or starch hydrolysate syrups (glucose syrup) in water. Other ingredients may be dissolved or dispersed within the syrup matrix in order to modify the texture, flavor, and appearance of the end product as desired. As noted above, these other ingredients include, but are not limited to, fats, flavors, coloring agents, acids, hydrocolloids, maltodextrins, emulsifiers, sugar crystals, aerating agents, and the like.

Examples of other hydrocolloids which may be present in the end product include, but are not limited to, agar agar, xanthane gum, locust bean gum, gellan gum, pectin, carrageenan, and guar gum.

The chewy confectionery products of the present invention may be prepared by conventional methods. For example, the ingredients may be blended to form a syrup, then cooked, shaped, and, if necessary, dried. The processing methods selected will affect the final texture of the products. It is necessary for the products to be heated during processing in order to gelatinize at least a major part, preferably all, of the oxidized starch in the final product.

The ingredients may be blended with agitation, for example, using conventional stirrers. Preferably a syrup of sugars, oxidized starch, and water are blended first followed by the addition of the remaining additives, for example, acid, flavor, color, humectants, etc. (acid, flavor, etc. are normally added after cooking) to give a syrup having the desired final solids content.

The initial mixture of ingredients may be cooked by open pan boiling, for example, by use of a jet cooker, coil cooker, plate heat exchanger, or a cooker extruder. The operating conditions will vary depending on the selected cooking equipment, formulation, ingredients, etc.

The product may then be shaped using conventional techniques and subjected to a cooling/drying stage as required.

The cooking process may also include more elaborate manufacturing processes such as continuous evaporation and continuous starch cooking; the inclusion of an aerating stage by beating or pulling; continuous cooling, such as, by cooling rollers; and forming operations such as extrusion, rope forming, cut and wrap forming, or dye-forming.

EXAMPLES

The following examples provide formulation and processing details for gelatin-free chewy confectionery products according to the invention. The examples are intended for illustrative purposes and are not intended to be limiting.

Example 1

A chewy confectionery product in which a combination of oxidized starch and gum arabic replaces the gelatin in the final product is produced by a method wherein 3.5% oxidized starch and 1.5% gum arabic (dry content) is cold slurried in water and then heated at 95° C. Sugar is then dissolved into the cooked mass (42.1% dry), before adding glucose syrup (45.8% dry), fat (4.0% dry) and invert syrup (3% dry). A second cooking stage follows using a plate heat exchanger and a flash stage to give a final moisture content of 6–7%. Further processing of the cooked mass can follow using conventional processes.

Example 2

A chewy confectionery product having the following formulation is produced according to the present invention.

|  | Percent by weight |
|---|---|
| crystalline sucrose | 35 |
| glucose syrup (42DE) | 35 |
| oxidized starch | 5 |
| gum arabic | 5 |
| fat | 5 |
| water | 15 |

The chewy confectionery product is produced by a simple process employing the open pan method for cooking using a stirred steamed-jacketed confectionery boiling pan. The recipe water is heated to boiling (100° C.) and the oxidized starch is added, preferably as a dry mix with gum arabic. A high speed mixer is employed to give rapid dispersion. The oxidized starch gelatinizes on dispersion in excess hot water. The remaining ingredients are then combined with this solution. The batch is heated using a steam jacket to obtain a boiling temperature, preferably in the range of 115–125° C., depending on the desired final texture. Once the final cooking temperature is reached, the mass may be cooled, for example, by casting onto a cold slab. The product can then be apportioned as required.

Example 3

The following is an example of a liquid filling for a chewy confectionery product according to the invention:

TABLE 1

| Ingredients E or Pre-mix COMPONENT PARTS | | | | |
|---|---|---|---|---|
|  | grams | %/ww | g/dry weight | %/dry weight |
| Crystal Sugar | 500.00 | 42.699% | 499.50 | 55.472% |
| Glucose Syrup 42 ° DE | 500.00 | 42.699% | 400.00 | 44.422% |

TABLE 1-continued

Ingredients E or Pre-mix
COMPONENT PARTS

|  | grams | %/ww | g/dry weight | %/dry weight |
|---|---|---|---|---|
| Water | 170.00 | 14.518% | 0.00 | 0.000% |
| Citric Acid | 1.00 | 0.085% | 0.95 | 0.106% |
| Total Yield of Basic Mix | 1,171.00 | 100.000% | 900.45 | 100.000% |

The sugar, glucose, and water are mixed and warmed (<90° C.) to obtain a solution. The pre-mix is then boiled to a finished total solids content of 84%. The mix can then be flavored or acidified if desired.

The liquid filling may alternatively comprise different syrups, for example, corn syrup, invert syrup, sorbitol syrup, xylitol syrup (or other sugar alcohol syrups) or other sugar replacers. It may also contain functional ingredients, artificial sweeteners, fat, colors, flavor and/or flavor enhancers, acids (such as citric, malic, lactic acid, etc.) These acids may be buffered with salts. These fillings typically have a solids content of 73%-92%, preferably 82%-88%. The filling may be fat based (instead of water based i.e., syrup based) and may contain other ingredients such as sugar, sugar replacers, flavors, salts, nuts, cocoa or chocolate, etc.

The liquid filling and the chewy candy (as described in Example 1 or 2) can be combined using a batch roller forming line with a center filling lance. The lance delivers filling into the center of the mass of chew as it is drawn through a series of rotating discs to obtain a sized rope. The rope is then fed into a die-press operation to cut and form the rope into individual shapes.

What is claimed is:

1. A dissolvable chewy confectionery product consisting essentially of sugar, glucose syrup, oxidized starch and optionally gum arabic such that the oxidized starch and optional gum arabic are together present in an amount of about 0.5% to 20% by weight of the confectionery product, and wherein the confectionery product is not a toffee, gum, or jelly.

2. A chewy confectionery product according to claim 1 which is gelatin-free.

3. A chewy confectionery product according to claim 1 wherein the sugar is present in an amount of between about 20 to 70 percent by weight of the chewy confectionery product, the glucose syrup is present in an amount of between about 30 to 70 percent by weight of the chewy confectionery product, and the oxidized starch is present in an amount of between about 0.5 to 20 percent by weight of the chewy confectionery product.

4. A chewy confectionery product according to claim 1 wherein the ratio of sugar to glucose syrup is between about 1/0.4 to 1/4.

5. A chewy confectionery product according to claim 1 wherein the glucose has a dextrose equivalent of between about 39 and 48.

6. A chewy confectionery product according to claim 3, further consisting essentially of water in an amount of between about 2 and 10 percent by weight of the chewy confectionery product and fat in an amount of between about 0.5 to 20 percent by weight of the chewy confectionery product.

7. A chewy confectionery product according to claim 6, further consisting essentially of one or more additional ingredients selected from humectants, artificial sweeteners, emulsifiers, flavor enhancers, proteins, artificial and natural flavors, essential oils, fruit juices, vegetable juices and colorings.

8. A chewy confectionery product according to claim 7 wherein the one or more additional ingredients are present in an amount of between about 0.5 to 5 percent by weight based on the weight of the chewy confectionery product.

9. A chewy confectionery product according to claim 1, further consisting essentially of a center-tilled with a liquid, syrup, or powder.

10. A chewy confectionery product according to claim 1 wherein at least a part of the sugar is replaced with a sugar substitute.

11. A chewy confectionery product according to claim 1 wherein the oxidized starch is obtained from maize or potato.

12. A process for preparing a chewy confectionery product according to claim 1 which comprises:

heating the oxidized starch to gelatinize the oxidized starch;

mixing the gelatinized starch with the sugar and glucose syrup to produce a formulation mixture;

cooking the formulation mixture to provide a cooked mass; and shaping the cooked mass to produce the chewy confectionery product.

13. A process for preparing a chewy confectionery product according to claim 1 which comprises:

blending a syrup of sugars or sugar substitutes with oxidized starch and water to produce a mixture;

heating the mixture to gelatinize the oxidized starch;

cooking the mixture to provide a cooked mass; and shaping the cooked mass to produce the chewy confectionery product.

14. A chewy confectionery product according to claim 1, that is substantially gelatin-free.

15. A dissolvable chewy confectionery product comprising sugar, glucose syrup, oxidized starch and optionally gum arabic such that the oxidized starch and optional gum arabic are together present in an amount of about 0.5% to 20% by weight of the confectionery product, and one or more additional hydrocolloids, and wherein the confectionery product is not a toffee, gum, or jelly.

16. A chewy confectionery product according to claim 15, wherein the hydrocolloids and oxidized starch are each present in relative amounts of about 10% to 90%.

17. A chewy confectionery product according to claim 15 wherein the hydrocolloid is one or more selected from the group consisting of agar agar, xanthane gum, locust bean gum, gellan gum, pectin, carrageenan, and guar gum.

18. A dissolvable chewy confectionery product consisting essentially of:

about 20 to 70 weight percent sugar, sugar substitutes, or a combination thereof;

about 30 to 70 weight percent glucose syrup;

about 0.5 to 10 weight percent oxidized starch;

optionally from 0 to 10 weight percent gum arabic;

optionally about 0.5 to 20 weight percent fat;

and optionally about 2 to 20 weight percent water, wherein the chewy confectionery product is substantially gelatin free so that the chewy confectionery product is dissolved upon chewing while still having a gelatin texture.

* * * * *

UNITED STATES PATENT AND TRADEMARK OFFICE
CERTIFICATE OF CORRECTION

PATENT NO. : 6,531,174 B2
DATED : March 11, 2003
INVENTOR(S) : Barrett et al.

It is certified that error appears in the above-identified patent and that said Letters Patent is hereby corrected as shown below:

<u>Column 8,</u>
Line 6, change "center-tilled" to -- center-filled --.

Signed and Sealed this

Sixth Day of May, 2003

JAMES E. ROGAN
*Director of the United States Patent and Trademark Office*